(12) United States Patent
Alvarez Lopez et al.

(10) Patent No.: US 10,760,313 B2
(45) Date of Patent: Sep. 1, 2020

(54) LOCKING CYLINDER HINGE

(71) Applicant: GM Global Technology Operations LLC, Detroit, MI (US)

(72) Inventors: Andres Omar Alvarez Lopez, Toluca (MX); Uriel Torres Davalos, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 16/193,492

(22) Filed: Nov. 16, 2018

(65) Prior Publication Data

US 2020/0157862 A1    May 21, 2020

(51) Int. Cl.
| | |
|---|---|
| *B60R 11/06* | (2006.01) |
| *E05D 7/10* | (2006.01) |
| *E05D 3/02* | (2006.01) |
| *B60R 7/04* | (2006.01) |

(52) U.S. Cl.
CPC ............. *E05D 7/1061* (2013.01); *B60R 7/04* (2013.01); *E05D 3/02* (2013.01); *E05Y 2900/538* (2013.01)

(58) Field of Classification Search
CPC . F16M 11/10; F41C 23/16; B60R 7/14; E04B 1/344; E05B 73/0041; E05D 11/1007; A47J 2037/0617; A47J 37/0611; F41A 3/66

See application file for complete search history.

(56) References Cited

U.S. PATENT DOCUMENTS

| | | | | | |
|---|---|---|---|---|---|
| 5,576,929 | A | * | 11/1996 | Uchiyama | A45C 13/1076 190/109 |
| 7,937,169 | B2 | * | 5/2011 | Kneller | B64D 11/003 244/118.1 |
| 8,955,805 | B2 | * | 2/2015 | Savian | B64D 11/0015 244/118.5 |
| 9,789,963 | B2 | * | 10/2017 | Savian | B64D 11/003 |
| 10,029,794 | B2 | * | 7/2018 | Savian | B64D 11/0015 |
| 10,106,258 | B2 | * | 10/2018 | Kammerer | B64D 11/003 |
| 2007/0018043 | A1 | * | 1/2007 | Lamoree | B64D 11/003 244/118.1 |
| 2008/0078868 | A1 | * | 4/2008 | Lamoree | B64D 11/003 244/118.1 |
| 2008/0078869 | A1 | * | 4/2008 | Kneller | B64D 11/003 244/118.5 |
| 2008/0078870 | A1 | * | 4/2008 | Kneller | B64D 11/003 244/118.5 |
| 2008/0112754 | A1 | * | 5/2008 | Schmitz | B60R 5/003 403/350 |

(Continued)

FOREIGN PATENT DOCUMENTS

| | | |
|---|---|---|
| DE | 102007031918 A1 | 12/1899 |
| DE | 102018126565 A1 | 5/2019 |

*Primary Examiner* — Kiran B Patel

(57) ABSTRACT

A stowage compartment for a vehicle comprises a bin, a lid, and a first hinge assembly. The bin includes a bottom surface and a first hinge mount. The lid includes a second hinge mount and a latch mechanism. The second hinge mount is disposed proximate the first hinge mount of the bin. The first hinge assembly includes a lock barrel and a free barrel. The lock barrel is rotatably supported in the first hinge mount of the bin, the free barrel is fixed to the second hinge mount of the lid. The free barrel is disposed in and rotatably supported by an interior of the lock barrel.

20 Claims, 4 Drawing Sheets

(56) References Cited

U.S. PATENT DOCUMENTS

| | | | | |
|---|---|---|---|---|
| 2010/0040828 A1* | 2/2010 | Cook | .................. | B32B 3/12 |
| | | | | 428/116 |
| 2015/0102624 A1* | 4/2015 | Kmita | .................. | B60R 9/06 |
| | | | | 296/37.6 |
| 2015/0367783 A1* | 12/2015 | Gaudig | .................. | B60R 7/04 |
| | | | | 296/37.8 |
| 2017/0283058 A1* | 10/2017 | Papke | .................. | E05D 5/02 |
| 2018/0281967 A1* | 10/2018 | Stephens | .................. | B64D 11/0636 |
| 2020/0040620 A1* | 2/2020 | Cavallin | .................. | E05B 83/28 |

* cited by examiner

LOCKING CYLINDER HINGE

INTRODUCTION

The present disclosure relates generally to mechanical hinges and more particularly assemblies incorporating a mechanical hinge requiring minimal assembly effort and tooling.

When it comes to the design of interiors of vehicles, there are nearly as many varieties of stowage compartments, bins, cup holders and compartments as there are vehicles. The complexity of these design range from simple to complex. Stowage compartments are often designed by the constraints set upon them by the surrounding architecture. Safety devices, infotainment systems, seats, cup holders, and various controls are all vying for "real estate" on the interior of vehicles. Additional constraints placed on stowage compartment design include the ability to assemble the stowage compartments efficiently and ergonomically as well as performance characteristics in crash testing. Thus, improvements in the area of stowage compartments design and assembly are constantly sought.

Accordingly, there is room in the art for new and improved stowage compartments and mechanisms that allow for improved assembly, ergonomics, cost, safety, and performance characteristics of vehicle stowage compartments.

SUMMARY

The present disclosure provides a stowage compartment for a vehicle. The stowage compartment comprises a bin, a lid, and a first hinge assembly. The bin includes a bottom surface and a first hinge mount. The lid includes a second hinge mount and a latch mechanism. The second hinge mount is disposed proximate the first hinge mount of the bin.

In one example of the present disclosure, first hinge assembly includes a lock barrel and a free barrel. The lock barrel is rotatably supported in the first hinge mount of the bin, the free barrel is fixed to the second hinge mount of the lid. The free barrel is disposed in and rotatably supported by an interior of the lock barrel.

In another example of the present disclosure, the lock barrel of the first hinge assembly comprises a lever having a retention pin and the retention pin is disposed in a retention bore of the first hinge mount of the bin.

In yet another example of the present disclosure, the first hinge mount comprises a top portion, a side surface, and a retention bore and is disposed on the bottom surface of the bin proximate a first corner of the bin.

In yet another example of the present disclosure, the lock barrel comprises a side wall forming a hollow interior, a first end, and a second end, and the side wall comprises an opening to the hollow interior and a notch.

In yet another example of the present disclosure, the free barrel comprises a cylindrical shape, and a radially extending post. The free barrel is fixed to the second hinge mount via the radially extending post.

In yet another example of the present disclosure, the radially extending post of the free barrel is at least partially disposed in the notch of the lock barrel.

In yet another example of the present disclosure, the lock barrel further includes a lever having a retention pin, an angled portion, a first end, and a second end. The first end of the lever is fixed to a first end of the lock barrel. The angled portion is disposed between the first end and the second end. The retention pin is disposed between the angled portion and the second end of the lever.

In yet another example of the present disclosure, the lock barrel is disposed in at least one of a first position and a second position. The first position includes the lock barrel rotated in a first direction such that the opening of the side wall is uncovered by the first hinge mount and the lever of the lock barrel is extended vertically from the first hinge mount. The second position includes the lock barrel rotated in a second direction such that the opening of the side wall is covered by the first hinge mount and the lever of the lock barrel is disposed proximate a side surface of the first hinge mount and the retention pin of the lever is disposed in a retention bore of the first hinge mount.

The present disclosure also provides a stowage compartment for a vehicle. The stowage compartment includes a bin, a lid and a first hinge assembly. The bin includes a bottom surface and a first hinge mount. The first hinge mount comprises a retention bore disposed on a side surface of the first hinge mount and is disposed on the bottom surface of the bin proximate a first corner of the bin. The lid includes a second hinge mount and a latch mechanism. The second hinge mount is disposed proximate the first hinge mount of the bin. The first hinge assembly comprises a lock barrel and a free barrel. The lock barrel comprises a lever having a retention pin. The retention pin is disposed in the retention bore of the first hinge mount of the bin. The lock barrel is rotatably supported in the first hinge mount of the bin. The free barrel is fixed to the second hinge mount of the lid, and the free barrel is disposed in and rotatably supported by an interior of the lock barrel.

In one example of the present disclosure, the lock barrel comprises a side wall forming a hollow interior, a first end, and a second end, and the side wall comprises an opening to the hollow interior and a notch.

In another example of the present disclosure, the free barrel comprises a cylindrical shape, and a radially extending post, and the free barrel is fixed to the second hinge mount via the radially extending post.

In yet another example of the present disclosure, the radially extending post of the free barrel is at least partially disposed in the notch of the lock barrel.

In yet another example of the present disclosure, the lock barrel further includes a lever having a retention pin, an angled portion, a first end, and a second end. The first end of the lever is fixed to a first end of the lock barrel. The angled portion is disposed between the first end and the second end. The retention pin is disposed between the angled portion and the second end of the lever.

In yet another example of the present disclosure, the lock barrel is disposed in at least one of a first position and a second position. The first position includes the lock barrel rotated in a first direction such that the opening of the side wall is uncovered by the first hinge mount and the lever of the lock barrel is extended vertically from the first hinge mount, and the second position includes the lock barrel rotated in a second direction such that the opening of the side wall is covered by the first hinge mount and the lever of the lock barrel is disposed proximate a side surface of the first hinge mount and the retention pin of the lever is disposed in a retention bore of the first hinge mount.

In yet another example of the present disclosure, the stowage compartment includes a second hinge assembly. The bin further comprises a third hinge mount disposed on the bottom surface of the bin proximate a second corner of the bin. The second hinge assembly is supported by the third hinge mount.

The present disclosure also provides a hinge assembly for a stowage compartment. The hinge assembly includes a lock barrel and a free barrel. The lock barrel includes a first end, a second end, a lever, and a side wall forming a hollow interior. The lock barrel is rotatably supported by a first hinge mount disposed in the bin. The side wall comprises an opening to the hollow interior and a notch. The lever is disposed on the first end of the lock barrel and comprises a retention pin. The free barrel is fixed to a second hinge mount of the lid. The free barrel is disposed in and rotatably supported by an interior of the lock barrel.

In one example of the present disclosure, the free barrel comprises a cylindrical shape and a radially extending post. The free barrel is fixed to the second hinge mount via the radially extending post.

In another example of the present disclosure, the radially extending post of the free barrel is at least partially disposed in the notch of the lock barrel.

In yet another example of the present disclosure, the lever of the lock barrel further comprises an angled portion, a first end, and a second end. The first end of the lever is fixed to a first end of the lock barrel. The angled portion is disposed between the first end and the second end. The retention pin is disposed between the angled portion and the second end of the lever.

In yet another example of the present disclosure, the lock barrel is disposed in at least one of a first position and a second position. The first position includes the lock barrel rotated in a first direction such that the opening of the side wall is uncovered by the first hinge mount and the lever of the lock barrel is extended vertically from the first hinge mount. The second position includes the lock barrel rotated in a second direction such that the opening of the side wall is covered by the first hinge mount and the lever of the lock barrel is disposed proximate a side surface of the first hinge mount and the retention pin of the lever is disposed in a retention bore of the first hinge mount.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
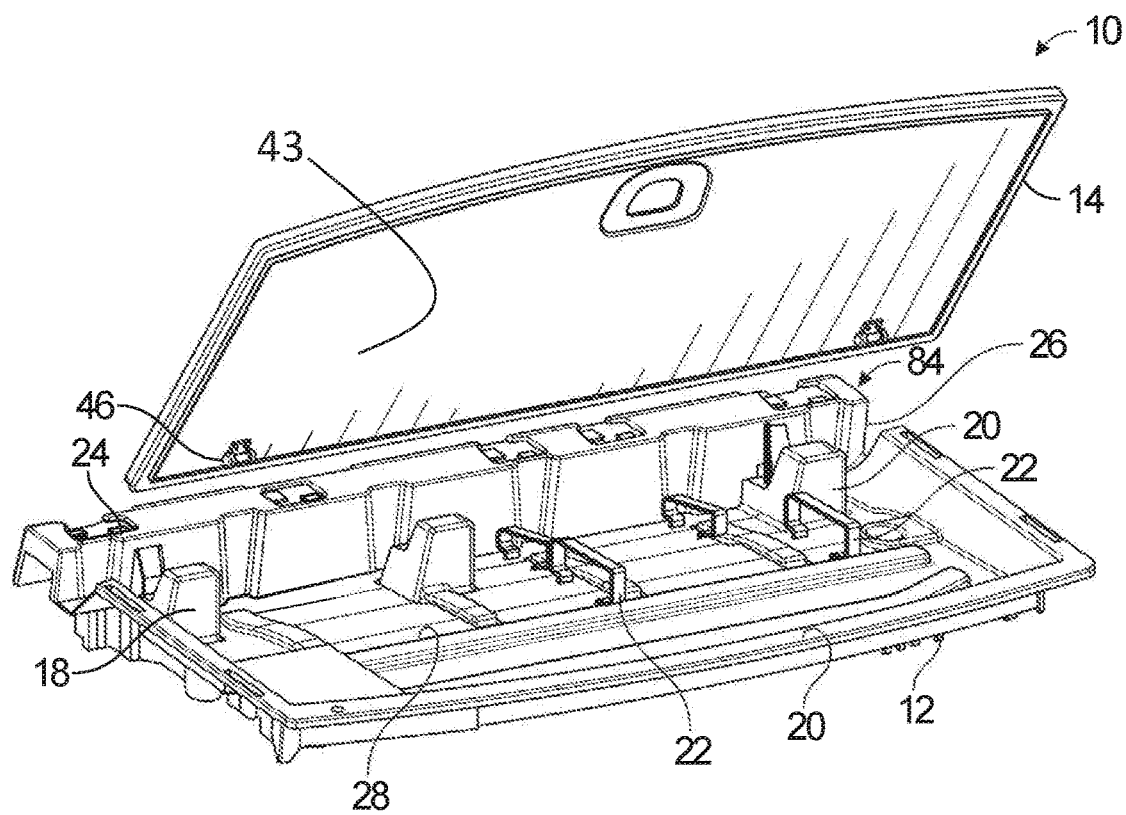
FIG. 1 is a perspective view of a stowage compartment assembly according to the principles of the present disclosure.

Examples of the present disclosure advantageously provide a stowage compartment 10 for a vehicle that is both easy to assemble and passes safety criteria for vehicle impacts. The stowage compartment 10 is illustrated in FIGS. 1-6 and will now be described. The stowage compartment 10 shown in totality in FIG. 1 includes a bin 12, a lid 14, and a hinge assembly 16. More particularly, the bin 12 is either mounted to, or a portion of a larger member that is a dash panel, a side panel, or a center counsel of an interior of the vehicle. The bin 12 includes a first and a second hinge mount 18, 20 and a latch retention portion (not shown). The bin 12 may include other features such as coin holders (not shown), tool retainers 22, etc. without departing from the scope of the disclosure. These features keep items that are stowed in the stowage compartment 10 from sliding about or rattling within the bin 12 while the vehicle is in motion.

The first hinge mount 18 is located proximate a first corner 24 of the bin 12 while the second hinge mount 20 is located proximate a second corner 26 of the bin 12 opposite the first corner 24. The first and second hinge mounts 18, 20, more easily viewed in FIGS. 2-6, are pedestal-type features projecting from the base 28 of the bin 12 and include a top portion 30 and a side surface 32. The top portion 30 receives the hinge assembly 16 that will be described further below. The side surface 32 includes a retention feature 36 or bore that functions to secure the hinge assembly 16 after the lid 14 is assembled to the bin 12.

The lid 14 of the stowage compartment 10 includes a first and second hinge mount portion 38, 40 which cooperate with the retention feature 36 and the hinge assembly 16 to maintain the lid 14 in a closed position, as will be described in greater detail below. The first and second hinge mount portions 38, 40 are disposed on the bottom surface 43 of the lid 14 proximate to the first and second hinge mounts 18, 20, respectively, of the bin 12. The first and second hinge mount portion 38, 40 may be a surface to which a portion of the hinge assembly 16 is fixed with fasteners or it may be a feature that includes a snap or interference fit as a way to retain the portion of the hinge assembly 16.

The hinge assembly 16 includes a lock cylinder or barrel 44 and a free cylinder or barrel 46. More particularly, the lock barrel 44 is rotatably supported and axially retained by the top portion 30 of the first hinge mount 18 of the bin 12 while the free barrel 46 is fixed to the hinge mounting portion 38 of the lid 14. The lock barrel 44, shown in more detail in FIG. 7, includes a rotating axis j that is coaxial with a rotating axis k of the free barrel 46 when assembled. The lock barrel 44 further includes a lever 48, a disk-like first end 50, a disk-like second end 52 opposite the first end 50, and a side wall 54 that only partially separates the interior surface 56 of the lock barrel 44 from the exterior leaving an opening 58. The lever 48 is an elongated portion having a first end 60 fixed to the first end 50 of the lock barrel 44, an angled portion 62 in the middle of the lever 48, a second end 64 opposite the first end 60, and a retention pin 66 disposed between the second end 64 and the angled portion 62. The side wall 54 of the lock barrel 44 includes a cut-away or notch 68 portion that further exposes the interior surface 56 from the exterior of the lock barrel 44.

The free barrel 46 is a hollow cylindrical shaped member including an outer surface 70, an inner surface 72, a first end 74, a second end 76 opposite the first end 74, and a radially extending post 78. More particularly, the free barrel 46 is fixed to the hinge mount portion 38 of the lid 14 via the post 78. The post 78 also has a cylindrical shape with a first end 80 fixed to the hinge mount portion 38 of the lid 14 and a second end 82 fixed to the free barrel. The length L1 of the free barrel 46, the distance from the first end 74 to the second end 76 is slightly less than the length L2 from the interior surface of the first end 50 of the lock barrel 44 to the interior surface of the second end 52 of the lock barrel 44. Furthermore, the outer diameter D1 of the free barrel 46 is slightly less than the inner diameter D2 of the lock barrel 44. The term slightly less as used in this context is defined as free to move relative to each other without imparting an excessive amount of interference or friction to prevent movement. In the same context, the diameter D1 and length L1 of the free barrel 46 should not be so small relative to the diameter D2 and length L2 of the lock barrel 44 so that the free barrel 46 rattles about the interior of the lock barrel 44. In addition to these dimensions, the diameter D3 of the post 78 is slightly less than the length L3 of the notch 68 of the lock barrel 44.

Figure 2:
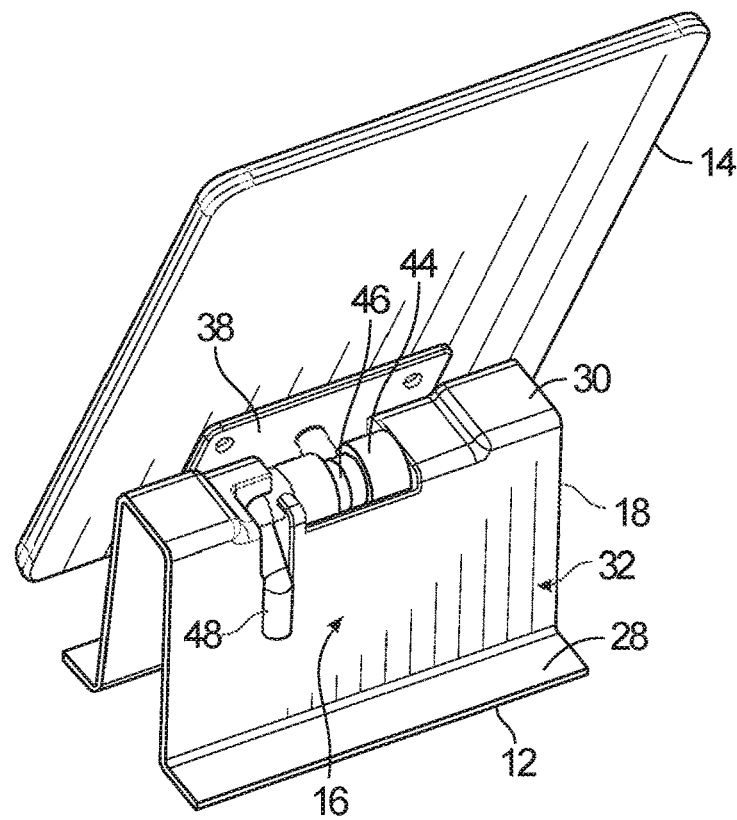
FIG. 2 is a perspective view of stowage compartment assembly according to the principles of the present disclosure.
Figure 3:
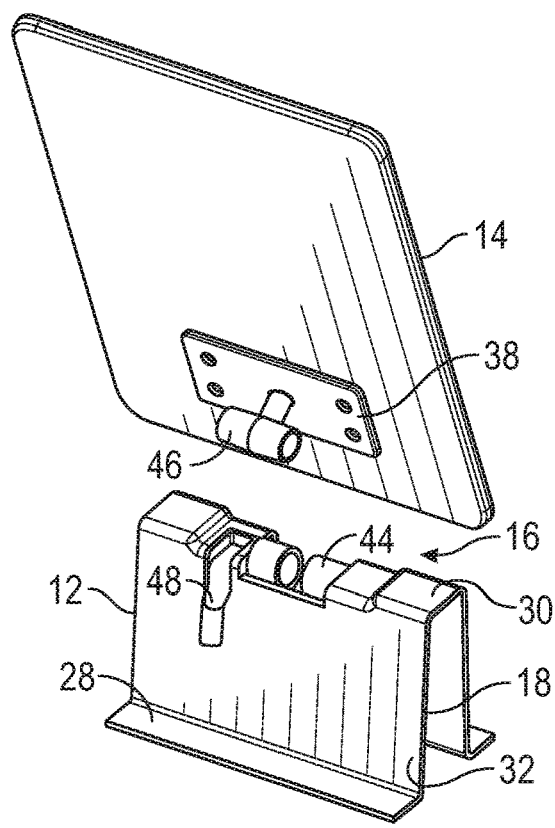
FIG. 3 is a perspective view of a disassembled stowage compartment according to the principles of the present disclosure.
Figure 4:
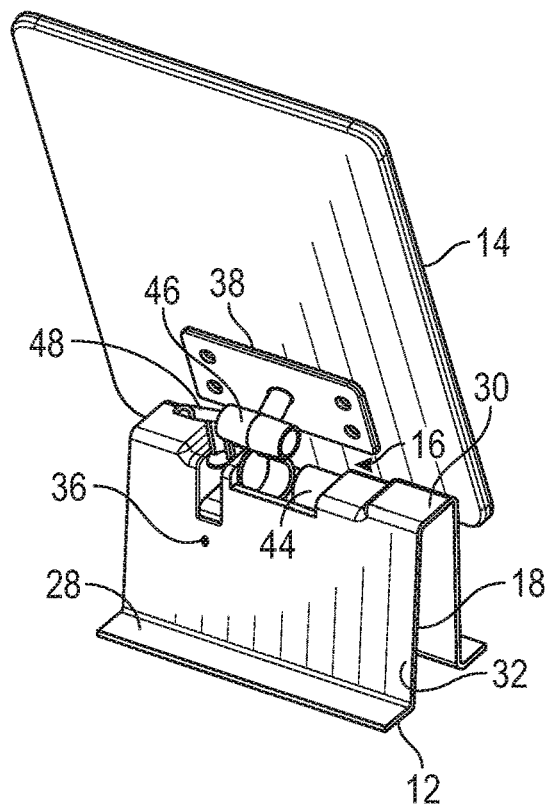
FIG. 4 is a perspective view of a disassembled stowage compartment according to the principles of the present disclosure.
Figure 5:
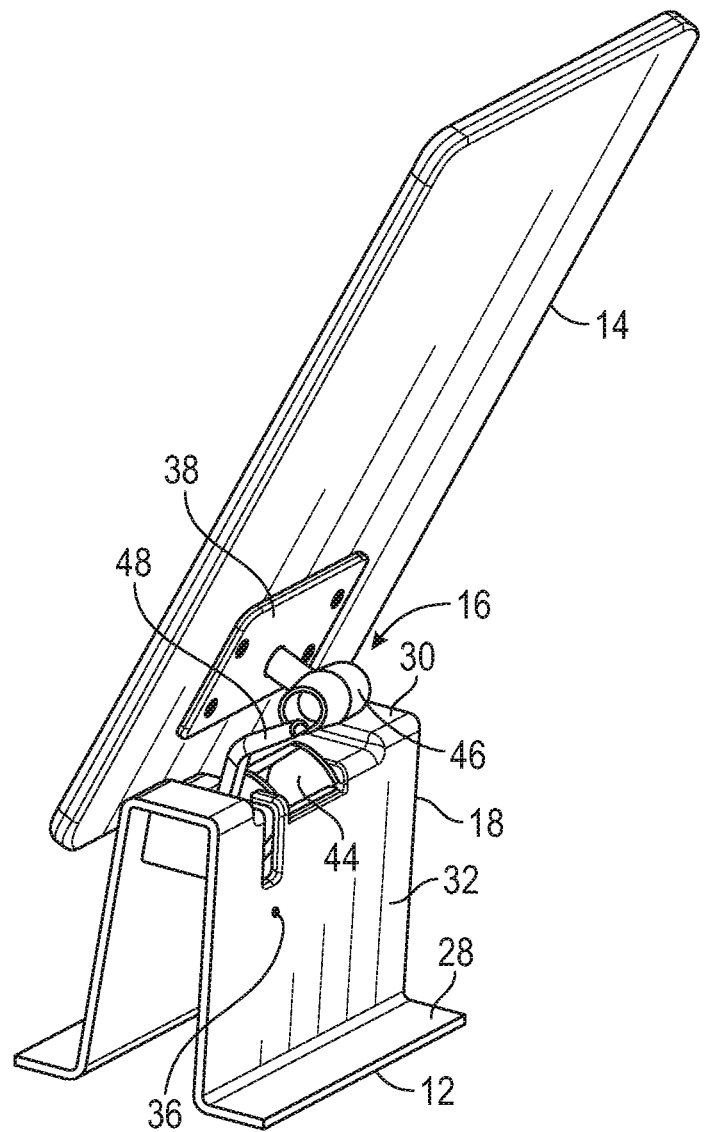
FIG. 5 is a perspective view of a disassembled stowage compartment according to the principles of the present disclosure.
Figure 6:
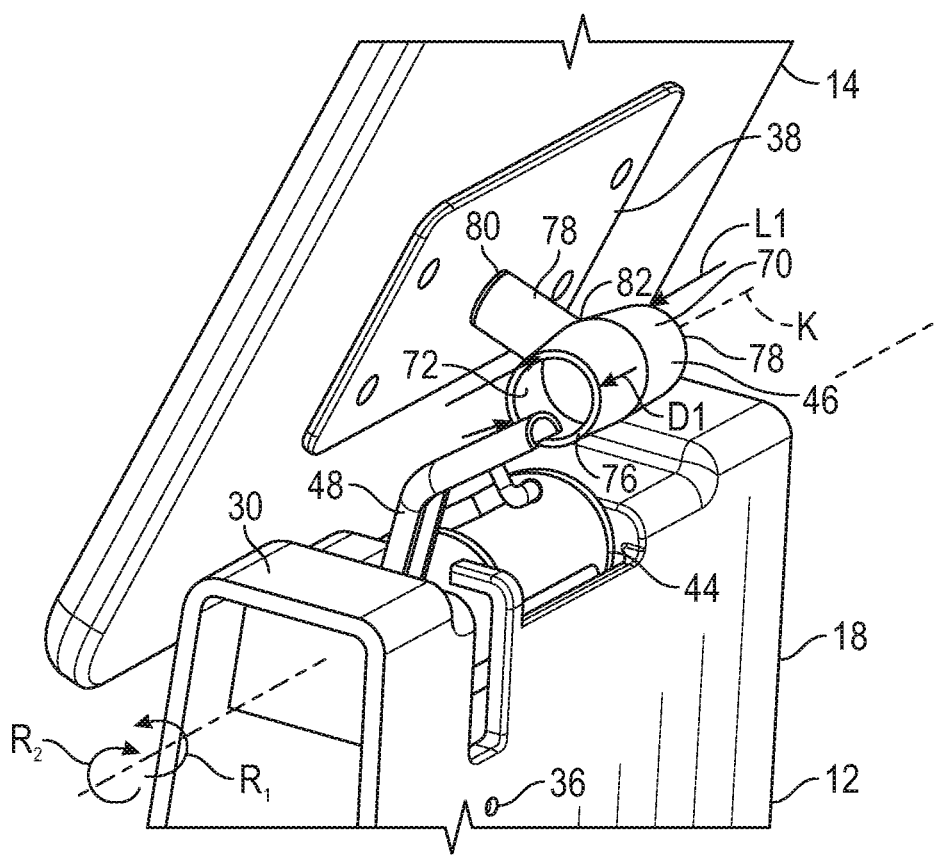
FIG. 6 is a perspective view of a disassembled stowage compartment according to the principles of the present disclosure.
Figure 7:
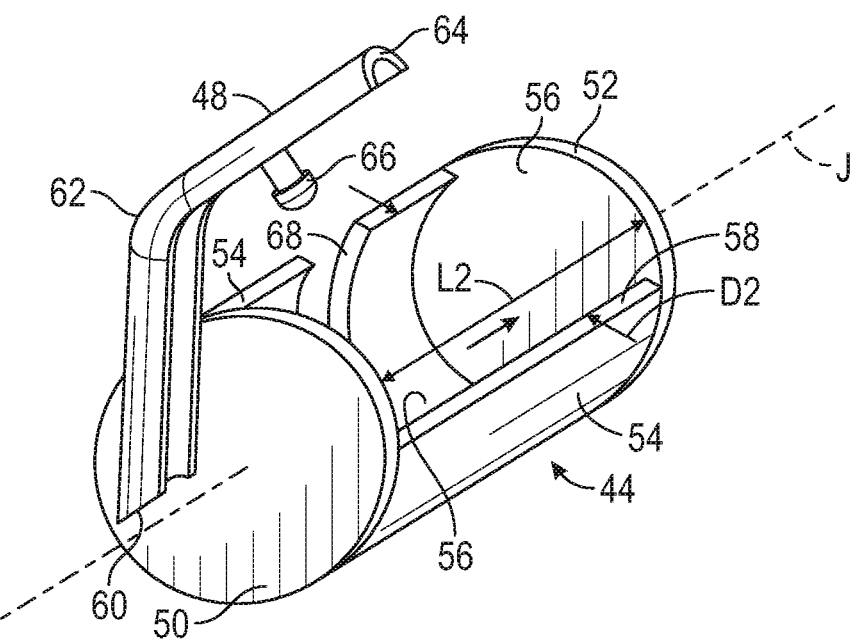
FIG. 7 is a perspective view of a portion of a hinge of a stowage compartment according to the principles of the present disclosure.

Looking now with more detail at FIGS. 2, 6, and 7, the assembly of the stowage compartment 10 is illustrated and will now be described. In FIG. 6, the lock barrel 44 is disposed in the top portion 30 of the first hinge mount 18 and rotated in a first rotational direction R1 such that the interior surface 56 of the lock barrel 44 is exposed and visible through the opening 58. The lid 14 and therefore the free barrel 46 is axially aligned with the axis J of the lock barrel 44 by disposing the free barrel 46 on the interior surface 56 of the lock barrel 44. This is shown more precisely in FIG. 7. Moving on to FIG. 2, the lock barrel 44 is rotated in the opposite second rotational direction R2 by moving the lever 48. The side wall 54 rotates into a position that closes the interior surface 56 of the lock barrel 44 and captures the free barrel 46 restricting it to the interior of the lock barrel 44. Additionally, the post 78 fits into the notch 68 of the lock barrel 44 and thus allows for a hinge-type movement between the lock barrel 44, the hinge mount 18 and the lid 14. The retention pin 66 of the lever 48 is received and retained through an interference fit by the retention feature 36 of the hinge mount 18 of the bin 12.

The above described features are duplicated for the second hinge mount 20 and a second hinge assembly 84.

While examples have been described in detail, those familiar with the art to which this disclosure relates will recognize various alternative designs and examples for practicing the disclosed structure within the scope of the appended claims.

The invention claimed is:

1. A stowage compartment for a vehicle, the stowage compartment comprising:
   a bin comprising a base and having a first hinge mount extending from the base;
   a lid having a bottom surface and a first hinge mount portion connected to the bottom surface, and wherein the first hinge mount portion is disposed proximate the first hinge mount of the bin;
   a hinge assembly comprising a lock barrel and a free barrel, and wherein the lock barrel is rotatably supported in the first hinge mount of the bin, the free barrel is fixed to the first hinge mount portion of the lid, and the free barrel is disposed in and rotatably supported by an interior of the lock barrel.

2. The stowage compartment of claim 1 wherein the lock barrel includes a lever having a retention pin and the first hinge mount includes a retention feature, and the retention pin is disposed in the retention feature when the lock barrel is rotated relative to the free barrel to latch the lid closed.

3. The stowage compartment of claim 1 wherein the first hinge mount comprises a top portion, a side surface, and a retention feature located on the side surface, and the first hinge mount is disposed proximate a first corner of the bin.

4. The stowage compartment of claim 1 wherein the lock barrel comprises a side wall forming a hollow interior, a first end, and a second end, and the side wall comprises an opening to the hollow interior and a notch.

5. The stowage compartment of claim 4 wherein the free barrel comprises a cylindrical shape, and includes a post extending radially from the cylindrical shape, and the free barrel is fixed to the first hinge mount portion via the post.

6. The stowage compartment of claim 5 wherein the post of the free barrel is at least partially disposed in the notch of the lock barrel.

7. The stowage compartment of claim 4 wherein the lock barrel further includes a lever having a retention pin, an angled portion, a first end, and a second end, and wherein the first end of the lever is fixed to a third end of the lock barrel, the angled portion is disposed between the first end and the second end, and the retention pin is disposed between the angled portion and the second end of the lever.

8. The stowage compartment of claim 7 wherein the lock barrel is disposed in at least one of a first position and a second position, the first position includes the lock barrel rotated in a first direction such that the opening of the side wall is uncovered by the first hinge mount and the lever of the lock barrel is extended vertically from the first hinge mount, and the second position includes the lock barrel rotated in a second direction such that the opening of the side wall is covered by the first hinge mount and the lever of the lock barrel is disposed proximate a side surface of the first hinge mount and the retention pin of the lever is disposed in a retention feature of the first hinge mount.

9. A stowage compartment for a vehicle, the stowage compartment comprising:
   a bin comprising a base and having a first hinge mount, and wherein the first hinge mount includes a retention feature disposed on a side surface of the first hinge mount, and wherein the first hinge mount is disposed on the base proximate a first corner of the bin;
   a lid having a first hinge mount portion, and wherein the first hinge mount portion is disposed proximate the first hinge mount of the bin;
   a hinge assembly comprising a lock barrel and a free barrel, and wherein the lock barrel comprises a lever having a retention pin and the retention pin is disposed in the retention feature of the first hinge mount of the bin, the lock barrel is rotatably supported in the first hinge mount of the bin, the free barrel is fixed to the first hinge mount portion of the lid, and the free barrel is disposed in and rotatably supported by an interior of the lock barrel.

10. The stowage compartment of claim 9 wherein the lock barrel comprises a side wall forming a hollow interior, a first end, and a second end, and the side wall comprises an opening to the hollow interior and a notch.

11. The stowage compartment of claim 10 wherein the free barrel comprises a cylindrical shape, and includes a post extending radially from the cylindrical shape, and the free barrel is fixed to the first hinge mount portion via the post.

12. The stowage compartment of claim 11 wherein the post of the free barrel is at least partially disposed in the notch of the lock barrel.

13. The stowage compartment of claim 10 wherein the lever of the lock barrel includes an angled portion, a first end, and a second end, the first end of the lever is fixed to a third end of the lock barrel, the angled portion is disposed between the first end and the second end, and the retention pin is disposed between the angled portion and the second end of the lever.

14. The stowage compartment of claim 13 wherein the lock barrel is disposed in at least one of a first position and a second position, the first position includes the lock barrel rotated in a first direction such that the opening of the side wall is uncovered by the first hinge mount and the lever of the lock barrel is extended vertically from the first hinge mount, and the second position includes the lock barrel rotated in a second direction such that the opening of the side wall is covered by the first hinge mount and the lever of the lock barrel is disposed proximate a side surface of the first hinge mount and the retention pin of the lever is disposed in a retention feature of the first hinge mount.

15. The stowage compartment of claim 14 further comprising another hinge assembly comprising a second hinge mount disposed on the base of the bin proximate a second corner of the bin, and further comprising a second hinge mount portion connected to the lid.

16. A hinge assembly for a stowage compartment comprising a bin and a lid, the hinge assembly comprising:
a lock barrel comprising a first end, a second end, a lever, and a side wall forming a hollow interior, and wherein the lock barrel is rotatably supported by a first hinge mount disposed in the bin, the side wall comprises an opening to the hollow interior and a notch, the lever is disposed on the first end of the lock barrel and comprises a retention pin;
a free barrel fixed to a first hinge mount portion of the lid, and the free barrel is disposed in and rotatably supported by an interior of the lock barrel.

17. The hinge assembly of claim 16 wherein the free barrel comprises a cylindrical shape, and includes a post extending radially from the cylindrical shape, and the free barrel is fixed to the first hinge mount portion via the post.

18. The hinge assembly of claim 17 wherein the post of the free barrel is at least partially disposed in the notch of the lock barrel.

19. The hinge assembly of claim 18 wherein the lever of the lock barrel further comprises an angled portion, a first end, and a second end, the first end of the lever is fixed to a third end of the lock barrel, the angled portion is disposed between the first end and the second end, and the retention pin is disposed between the angled portion and the second end of the lever.

20. The hinge assembly of claim 19 wherein the lock barrel is disposed in at least one of a first position and a second position, the first position includes the lock barrel rotated in a first direction such that the opening of the side wall is uncovered by the first hinge mount and the lever of the lock barrel is extended vertically from the first hinge mount, and the second position includes the lock barrel rotated in a second direction such that the opening of the side wall is covered by the first hinge mount and the lever of the lock barrel is disposed proximate a side surface of the first hinge mount and the retention pin of the lever is disposed in a retention feature of the first hinge mount.

* * * * *